Jan. 29, 1957  C. W. SWEITZER  2,779,664
CARBON BLACK PRODUCTION
Filed May 18, 1953
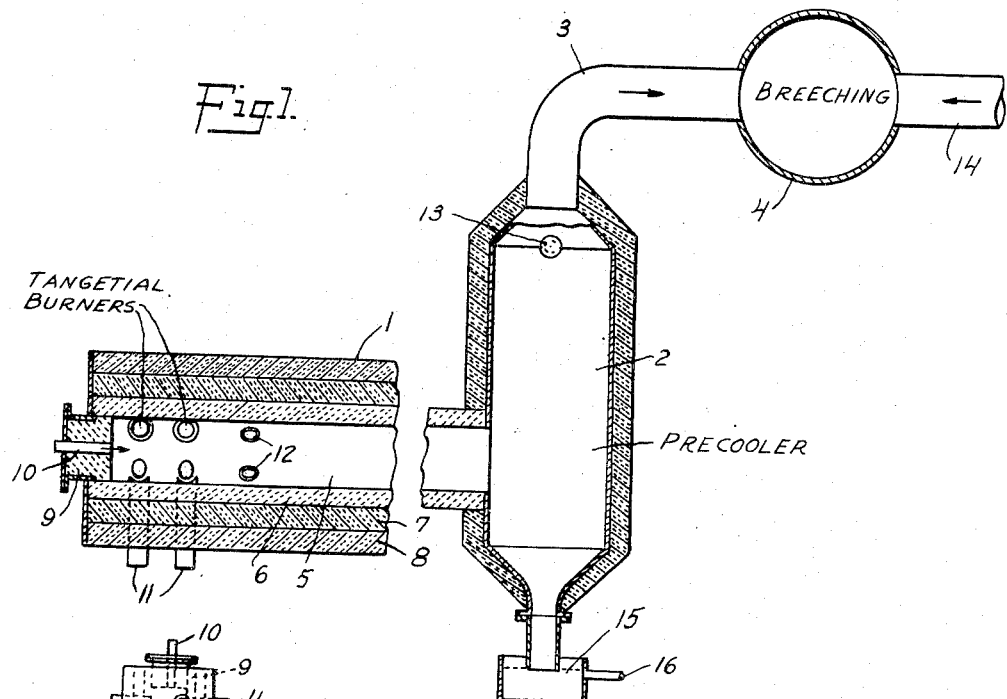
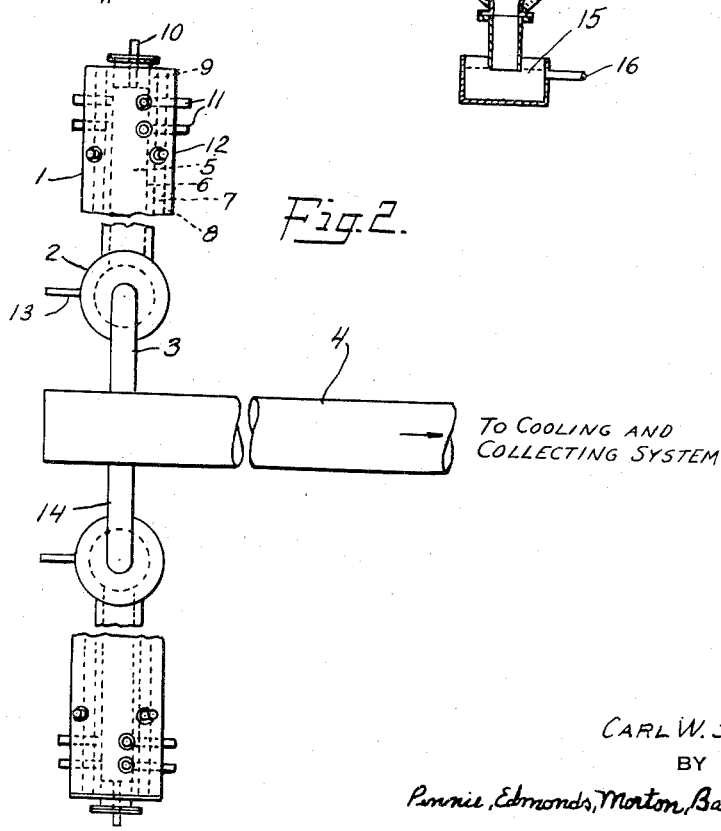
INVENTOR
CARL W. SWEITZER
BY
Pennie, Edmonds, Morton, Barrows & Taylor.
ATTORNEYS

United States Patent Office 2,779,664
Patented Jan. 29, 1957

2,779,664

CARBON BLACK PRODUCTION

Carl W. Sweitzer, Garden City, N. Y., assignor to Columbian Carbon Company, New York, N. Y., a corporation of Delaware Application May 18, 1953, Serial No. 355,534

4 Claims. (Cl. 23—209.4)

The present invention relates to the manufacture and treatment of carbon black and, more particularly, carbon black of the furnace type.

In my copending application Serial No. 80,573, filed March 9, 1949, now Patent No. 2,707,673, I have described and claimed a process for altering the surface of the particles of furnace carbons. In accordance with that process, air is passed in contact with a shallow bed of the furnace black while the latter is heated uniformly to a black heat temperature, below the ignition temperature of the furnace carbon, but not lower than 650° F., until the surface area of the particles of black has been completely oxidized and thereafter the resultant black is subjected to deactivation by heating it in a non-oxidizing atmosphere at a temperature within the range of 1,800 to 2,000° F. until a substantial portion of the oxygen absorbed on the surface of the carbon particles during the preliminary step has been driven off.

The process there described is subject to several objections. In the first place, it is a two-step process requiring the use of different atmospheres and different temperature conditions in the respective steps. Secondly, operating conditions must be carefully controlled, particularly in the preliminary step in order to avoid burning of the carbon. Further, the procedure is relatively slow and time consuming.

My present invention provides an improved method of similarly altering the surface of furnace blacks whereby each of the above-noted objections to my previous two-step process is entirely avoided.

A primary purpose of the two-step process previously noted is to increase the adsorptivity of a furnace carbon. As a result of that process, I can produce furnace carbons having ABC color numbers within the range of 95 to 175, a stiff paste oil absorption value within the range of 11 to 30 gallons per 100 pounds and an iodine adsorption value of 250 to 350 equivalents per gram $\times 10^{-5}$. While I have not been able to attain such extreme values by my present process, marked changes in the characteristics of the black in the noted respects have been obtained thereby.

While I do not intend to be bound to any theory as to the mechanism by which these characteristics of the furnace black are so drastically altered, a statement of my present theory may asist in conveying a clearer understanding of the invention.

It presently appears that, in the preliminary step of my previously noted two-step process, the outer surfaces of the carbon particles are oxidized to form oxides or carboxyl groups on the surfaces of the carbon particles without actually burning the carbon. By the second step of the process, these oxygen-containing groups are driven off, but in separating itself from the surface of the carbon particles, the oxygen appears to carry with it a carbon atom, thus leaving a tiny depression in the surface of the carbon particles. By this treatment, the mean particle diameters, as determined by the electron microscope, remain substantially unchanged.

The present invention provides improvements in processes for manufacturing furnace blacks of the type in which the black is produced by rapidly mixing a hydrocarbon with a stream of hot gases at a temperature in excess of that at which the hydrocarbon is decomposed to furnace black and the hydrocarbon is decomposed by heat absorbed from the hot gases to form furnace black in suspension therein and the suspension is thereafter cooled and the black separated from the gaseous suspension.

In such operations, the hot gases with which the hydrocarbon is mixed are, with advantage, hot blast flame gases or hot products of combustion, either of an oxidizing, neutral or reducing nature. In any event, any free oxygen present in the hot gases is consumed by reacting with the hydrocarbon make so that no free oxygen remains in the resultant gaseous suspension of the furnace black.

I have discovered that if such resultant suspension of furnace black, while still at the reactive temperature of the black, is rapidly mixed with a substantial proportion of oxidizing combustion gases, also at the reaction temperature of the black, and the amounts of the furnace black suspension and oxidizing combustion gas be so proportioned, with respect to the free oxygen content of the latter, as to result in a free oxygen concentration of the mixture initially within the range of about 0.5% to about 3% by volume, the two above-described reactions appear to proceed simultaneously and very rapidly. It would appear that, under these conditions, a state of substantial equilibrium is reached, the activation and deactivation of the carbon black surface proceeding simultaneously and at equal rates so that a very substantial increase in the adsorptivity of the carbon is attained quickly and with minimum attention and in a single operation.

Predicated upon this discovery, the present invention comprises the step in the furnace carbon producing process of the type just described, of rapidly mixing with the gaseous suspension of carbon black, while the latter is still at a reactive temperature, within the range of 1200° to 2200° F., a substantial proportion of oxidizing combustion gases, also at the reaction temperature of the carbon black, and so proportioning the amounts of the suspension and of the hot oxidizing combustion gases mixed therewith, with respect to the free oxygen content of the latter, as to result in a carbon black suspension at reaction temperature and of an initial free oxygen concentration within the range of about 0.5% to about 3% by volume.

The optimum initial concentration of oxygen in the resultant mixture appears to depend primarily upon the temperature of the mixture. Where the initial oxygen concentration is in the lower end of the stated range, that is below about 1 to 1½%, the resultant mixture should be at the upper end of the temperature range, say from 1800° to 2200° F. With higher concentration of free oxygen, temperatures as low as 1200° F. are effective. A temperature of about 1500° F. and an initial free oxygen concentration of about 2 to 3% have given most satisfactory results.

The oxidizing combustion gases for mixing with the furnace black suspension may be obtained from any convenient source, but should be at a reactive temperature of the carbon black, advantageously at a temperature approximating that of the suspension with which it is to be mixed, and should contain free oxygen of a concentration within the range of about 1% to about 6%. At lower oxygen concentrations, excessive amounts of the gas are required. At higher concentrations, the carbon is apt to be adversely affected by the oxygen before uniform mixing can be effected.

The invention will be further described and illustrated by the following description of an advantageous embodiment of the invention with reference to the accompanying drawing which represents one type of apparatus which has been used, with particular advantage.

Figure 1 of the drawing represents conventionally and somewhat fragmentarily an elevational, sectional view of the apparatus and Figure 2 represents, also conventionally and somewhat fragmentarily, a plan view of the apparatus.

The apparatus shown consists primarily of a carbon black furnace 1 leading at its downstream end into a vertical precooler 2, the precooler being connected at its upper end by conduit 3 to a horizontal breeching 4 which leads to conventional cooling and furnace black collecting apparatus not shown.

The furnace and precooler may, with advantage, be of the type disclosed in the Ekholm Patent No. 2,599,981. The process by which the black is produced in suspension may, with advantage, be that described and claimed in said patent.

The furnace comprises a cylindrical, elongated reaction chamber 5 delineated by a wall 6 of highly refractory furnace lining material which, in turn, is covered exteriorly by layers 7 and 8 of heat-insulating material. The upstream end of the chamber is closed by end block 9 through which there extends tube 10 which may be used for lighting the furnace and which, in normal operation, may be closed at its outer end.

Extending through the layers of heat insulation and the furnace wall, substantially normal to the longitudinal axis of the chamber, are blast burners 11 entering the chamber in a direction substantially tangential to the furnace wall. In the particular apparatus shown, two sets of blast burners are provided to permit a choice of the zone of the furnace chamber into which the blast flame gases are injected, particularly with respect to the point of injection of the hydrocarbon to be decomposed.

The hydrocarbon to be decomposed herein sometimes referred to as hydrocarbon make, is injected into the furnace chamber through make injection tubes 12 which enter the chamber in a substantially radial direction. In the particular apparatus shown, four hydrocarbon make injection tubes are provided, symmetrically spaced about the periphery of the chamber. Each set of blast burners also usually consists of four burners symmetrically spaced about the periphery of the furnace chamber.

In operation, a combustible mixture of a fluid hydrocarbon fuel and air is blasted at high velocity through the tangentially positioned blast burners 11 and is ignited and burned within the chamber to form a hot, high velocity stream of blast flame gases rapidly swirling through the furnace chamber, along a more or less helical path. As previously noted, this combustible mixture may be injected into a zone of the chamber more or less removed from the end block 9, by selection of one or the other of the sets of blast burners.

The hydrocarbon to be decomposed is injected into the chamber through the radial tubes 12 and is extremely rapidly and uniformly mixed with the swirling stream of blast flame gases and is heated by heat absorbed therefrom and thereby decomposed to form carbon black in suspension in the furnace gases.

The resultant suspension of carbon black passes from the downstream end of the chamber 5 into the precooler 2. In passing through the precooler, the temperature of the suspension is usually reduced somewhat by means of water sprays, such as shown at 13, and the partially cooled suspension passes through conduit 3 into breeching 4.

In breeching 4, the carbon black suspension, while still at a reactive temperature, is rapidly mixed with hot oxidizing products of combustion introduced into the breeching through conduit 14. The gases supplied through conduit 14 may be obtained from any convenient source, but should be at a reactive temperature of the furnace carbon and must be supplied in sufficient quantity to provide a free oxygen concentration in the resultant suspension within the previously specified range. Also, the separately generated gases should be supplied at a velocity such as to promote rapid, uniform mixing with the furnace black suspension. Such rapid mixing is promoted by causing the gas streams to impinge on each other as they enter from opposite sides of the breeching, as shown.

I have, with advantage, supplied the separately generated combustion gases from a carbon black furnace of the type just described by supplying to the furnace a combustible mixture of a hydrocarbon fuel and air in such proportions as to produce products of combustion containing free oxygen in concentration within the indicated range and adding no hydrocarbon make to the resultant blast flame gases.

Apparatus suitable for such operation is shown in Figure 2 in which two substantially identical carbon black furnaces are shown, each leading to substantially identical precoolers and, from thence, into the main breeching 4 where the furnace black suspension produced in one of the furnaces is mixed with the oxidizing combustion gases resulting from the operation of the other furnace with no injection of hydrocarbon make.

While I have shown but one furnace operating for the production of furnace black suspension and one furnace operating for production of oxidizing combustion gases leading into the breeching 4, it will be understood that any desired number of the carbon black producing furnaces and oxidizing combustion gas producing furnaces may lead into a single breeching, the number of the respective furnaces depending upon their respective capacities and the desired concentration of free oxygen in the resultant suspension.

The diameter and length of the breeching 4 should usually be so related to the number and capacity of the furnaces connected thereto that the furnace black will remain suspended in the hot oxidizing gases for about 0.3 to about 1 second before being cooled to below the reaction temperature of the black. However, contact periods at reactive temperatures of as long as two seconds have been used, with advantage, and are contemplated by the present invention.

The optimum time factor will depend upon the temperature of the suspension in the breeching 4 and the oxygen concentration thereof and, of course, upon the desired extent of modification of the characteristics of the black.

In the apparatus of the drawing no refractory lining has been shown in conduit 3 and breeching 4. Under such condition, it is usually necessary to reduce the temperature of the furnace black suspension passing from the upper end of the precooler to about 1500° F. in order to avoid damaging such unlined conduits. Under such circumstances, the separately generated oxidizing combustion gases will normally enter the breeching 4 at approximately 1500° F., or slightly lower.

The desired amount of cooling in the precooler may be effected by the use of a greater or less amount of water spray. Any unvaporized water or carbon slurry resulting from the water sprays will pass from the lower end of the precooler into the sump 15 from which it is withdrawn through line 16.

It will be understood that the utility of the present invention is not restricted to use in conjunction with furnace black producing processes of the particular type described above. The furnace black suspension treated in accordance with the present invention may be produced by other methods, for instance, by the process described and claimed in the Wiegand and Braendle Patent No. 2,440,424 or in the Wiegand and Braendle Patent 2,499,437. It is essential, however, that, in mixing the oxidizing combustion gases with the furnace black suspension, localized chilling of the suspension to below the reaction temperature of the carbon be avoided and that localized excessive free oxygen concentration likewise be avoided.

An especially useful application of the present invention is in lowering the modulus characteristics and lowering the curing or vulcanizing rate of the furnace black when used in rubber compositions, especially where the resultant furnace carbon is to be compounded with low temperature polymers, i. e., synthetic rubber of the GRS type in which the polymerization is effected at low temperatures.

The following specific example is given as illustrative of the procedure in accordance with the present invention and the advantages derived therefrom. It will be understood, however, that this example is for illustrative purposes and is not to be considered as limitative.

The apparatus used in this operation was substantially as represented by the drawings except that five pairs of furnaces of the type described were connected into the breeching 4 instead of the single pair of furnaces shown in Figure 2 of the drawing. In the operation, four of the furnaces were used to produce gaseous suspensions of carbon black and five of the furnaces were used for the separate generation of oxidizing combustion gases. To each of the furnaces producing furnace black suspension a combustible mixture was supplied at the rate of 180,000 cubic feet of air and 17,100 cubic feet of natural gas per hour. To each of the furnaces used for producing oxidizing combustion gases, a combustible mixture was supplied at the rate of 140,000 cubic feet of air and 9,400 cubic feet of natural gas per hour. The hydrocarbon make used in the four furnaces operating to produce furnace carbon was a high molecular weight, normally liquid aromatic hydrocarbon and was sprayed into each of the four furnace chambers at a rate of 205 gallons per hour.

The resultant gaseous suspension of furnace black entering the breeching 4 was shown by analysis to contain no free oxygen. The separately generated combustion gas was shown by analysis to contain 6.2% free oxygen. The composite suspension, immediately after mixing in the breeching, contained 2.3% free oxygen and its temperature was approximately 1500° F. In this operation, the average contact time of the furnace black with the composite hot gases at the reactive temperature was approximately 0.7 second.

The product from the foregoing operation was collected and compared with a product obtained from the same apparatus under identical conditions, except that all of the furnaces were used for the production of furnace black suspensions and the resultant suspension was cooled and the carbon black collected therefrom without being mixed with separately generated oxidizing furnace gases. Characteristics of the two furnace carbons are set forth in the following tabulation, the test methods being identical in each case and the rubber in each case being a low temperature polymer, such as previously referred to herein, compounded according to the standard L. T. P. test tread composition.

|  | Untreated | Treated |
|---|---|---|
| Properties of the Carbon: | | |
| Color | 102 | 102 |
| Tinting Strength | 94 | 95 |
| Oil Absorption | 16.8 | 16.7 |
| Iodine Adsorption | 66 | 75 |
| DPG Adsorption | 2.2 | 4.6 |
| Rubber Compounding Properties: | | |
| Optimum cure at 292° F. (minutes) | 40 | 60 |
| Tensile Strength (lbs./sq. in.) | 3,050 | 3,025 |
| Modulus @ 30 minutes' cure | 975 | 625 |
| Modulus @ 60 minutes' cure | 1,375 | 1,100 |

The method of mixing the carbon black suspension with the oxidizing combustion gases is not critical so long as rapid, uniform mixing is obtained.

The present application is in part a continuation of my copending application Serial No. 140,774, filed January 27, 1950, now abandoned.

I claim:

1. In the process for making furnace black whereby a hydrocarbon is rapidly mixed with a stream of hot gases passing through an elongated furnace chamber and is decomposed by heat absorbed from the hot gases to form furnace black in suspension therein and the suspension is thereafter passed from the chmber, cooled and the black separated from the gaseous suspension, the steps of separately generating oxidizing combustion gases containing from about 1 percent to about 6 percent, by volume, of free oxygen at a reaction temperature of the black within the range of 1200° to 2200° F. and rapidly uniformly mixing the hot separately generated oxidizing gases with the gaseous suspension of the furnace black while the suspension is still at a reactive temperature of the black within the said range, and so proportioning the amount of oxidizing combustion gases mixed with the suspension, with respect to the free oxygen content of said gases, as to result in an initial free oxygen concentration of the mixture of about 0.5 percent to about 3 percent by volume.

2. The process of claim 1 in which the composite mixture of furnace black suspension and oxidizing combustion gases is maintained at a reactive temperature within the said range for from about 0.3 second to about 2 seconds.

3. Process of claim 1 in which the initial temperature of the resultant composite mixture of furnace black suspension and oxidizing combustion gases is within the range of 1800° to 2200° F. and the initial free oxygen concentration of the mixture is within the range of 1% to 1½% by volume.

4. The process of claim 1 in which the initial temperature of the resultant composite mixture of furnace black suspension and oxidizing combustion gases is about 1500° F. and the free oxygen concentration of the initial mixture is within the range of 2% to 3%.

References Cited in the file of this patent

UNITED STATES PATENTS

| Re. 22,886 | Ayers | June 3, 1947 |
| 1,508,367 | Matlock | Sept. 9, 1924 |
| 2,144,971 | Heller et al. | Jan. 24, 1939 |
| 2,375,795 | Krejci | May 15, 1945 |
| 2,499,438 | Wiegand et al. | Mar. 7, 1950 |
| 2,597,232 | Eckholm et al. | May 20, 1952 |